United States Patent [19]

Brandt

[11] Patent Number: 5,058,427
[45] Date of Patent: Oct. 22, 1991

[54] ACCUMULATING ALTIMETER WITH ASCENT/DESCENT ACCUMULATION THRESHOLDS

[75] Inventor: Jobst Brandt, Palo Alto, Calif.

[73] Assignee: Avocet, Inc., Menlo Park, Calif.

[21] Appl. No.: 590,472

[22] Filed: Sep. 28, 1990

[51] Int. Cl.[5] .............................................. G01C 21/20
[52] U.S. Cl. ..................... 73/384; 340/977; 364/433
[58] Field of Search ................. 73/384, 385, 386, 387; 364/433; 340/977, 432

[56] References Cited

U.S. PATENT DOCUMENTS

| | | | |
|---|---|---|---|
| 3,958,108 | 5/1976 | Shimomura | 235/150.25 |
| 4,030,065 | 6/1977 | Bateman | 340/27 |
| 4,106,343 | 8/1978 | Cook | 73/387 |
| 4,257,112 | 3/1981 | Hubner | 368/11 |
| 4,279,028 | 7/1981 | Lowdenslager et al. | 368/11 |
| 4,292,671 | 9/1981 | Evans et al. | 364/433 |
| 4,507,962 | 4/1985 | Hitt et al. | 73/384 |
| 4,638,664 | 1/1987 | Tamura | 73/384 |
| 4,694,694 | 9/1987 | Vlakancic et al. | 73/386 |
| 4,969,358 | 11/1990 | Peet, II | 73/384 |
| 5,001,929 | 3/1991 | Peet, II | 73/384 |

FOREIGN PATENT DOCUMENTS 3638122  5/1988  Fed. Rep. of Germany ...... 340/977

*Primary Examiner*—Donald O. Woodiel
*Attorney, Agent, or Firm*—Limbach, Limbach & Sutton

[57] ABSTRACT

An accumulating altimeter includes a programmable accumulator which selectively accumulates altitude changes from a reference altitude in accordance with accumulation thresholds. Altitude changes in the direction of interest, e.g. altitude gains, are accumulated once a non-opposing accumulation threshold has been reached. Opposing altitude changes which are less than an opposing accumulation threshold are used to offset non-opposing changes. Opposing altitude changes which are equal to or greater than the opposing accumulation threshold are used to re-establish the reference altitude, whereafter accumulation of non-opposing altitude changes resume after the non-opposing accumulation threshold has been reached.

20 Claims, 5 Drawing Sheets

ACCUMULATING ALTIMETER WITH ASCENT/DESCENT ACCUMULATION THRESHOLDS

BACKGROUND OF THE INVENTION

1. Field of the Invention

The present invention relates to altimeters, and in particular, to accumulating altimeters which selectively accumulate total altitude gains or losses for ascents or descents, respectively, for a selected period of time.

2. Description of the Related Art

With the development of solid state altimeters, such as those using piezoelectric or piezoresistive elements, use of altimeters for various activities has grown. One such use is for bicyclists to record altitude gained or lost during a bicycle trip. In particular, those who train and compete in bicycle races often wish to know the altitude gain or loss during a training ride. This helps provide an insight to the training regimen and whether it is correct for the event for which they are training.

Conventional accumulating altimeters can provide information regarding altitude gain or loss. For example, U.S. Pat. No. 4,694,694 discloses an altimeter which accumulates and displays total altitude gains or losses over a selected interval of time. If set to accumulate and display total gains in altitude, any and all altitude gains are accumulated and displayed.

However, such indiscriminate altitude accumulation may not be meaningful and can be misleading. During virtually any bicycle ride, slight undulations in terrain, including grade separations at railroads and highways, as well as transient barometric pressure variations can cause the altimeter to mistakenly detect that it has gained or lost altitude. This causes the accumulated altitude (gain or loss) to increase, although no net change has occurred. In other words, even though the instrument may have detected a number of altitude changes while traversing a number of rises or depressions in the roadway, such changes do not correctly represent the work or effort put forth by the rider.

For a cyclist, ascents and descents of grade separations are of no interest. If the accumulating altimeter accumulates all altitude gain or loss, however small, the cyclist will not receive meaningful information regarding the effort put forth, and therefore the training value of the ride.

Furthermore, the altimeter is subject to mechanical vibration and electrical noise within its own circuits. These also can cause the altimeter to accumulate further altitude gains or losses. The errors introduced from these effects can be substantial. For example, typical altitude measurement errors can be on the order of 10–20 feet due to mechanical vibration or electrical noise within the altimeter.

Therefore, it is desirable to have an accumulating altimeter which can selectively accumulate altitude changes such as gains, while selectively ignoring some, but not all, opposing altitude changes such as losses. In other words, it would be desirable to have an accumulating altimeter that can selectively ignore insignificant altitude changes, due to such things as mechanical vibration, slightly rolling terrain or highway overpasses, while at the same time being capable of recognizing significant altitude changes, due to such things as riding over a hill or into a valley.

SUMMARY OF THE INVENTION

An accumulating altimeter in accordance with the present invention has selective ascent and descent accumulation thresholds which allow it to initially ignore altitude gains or losses below predetermined amounts, while accounting for altitude gains and losses exceeding the predetermined amounts.

The present invention accepts a signal representing the present altitude. If the accumulator is enabled, it first determines whether the altitude has changed, and if so, whether the altitude change is in the direction of interest and is greater than or equal to a first accumulation threshold. If it is, the accumulator begins to accumulate altitude changes in the direction of interest.

However, if the altitude change opposes that which the accumulator is programmed to accumulate, e.g. the present altitude is decreasing when the accumulator is programmed to accumulate increases in altitude, one of two things happen. If the opposing change in altitude does not meet or exceed a second accumulation threshold, it will simply be used to offset non-opposing altitude changes, i.e. altitude changes in the direction of interest. On the other hand, if the opposing change in altitude does reach the second accumulation threshold, a new reference altitude is established and all further non-opposing changes in altitude will be accumulated, once they in turn meet or exceed the first accumulation threshold. The first and second accumulation thresholds can be different or equal, as desired.

Therefore, the present invention allows for selective accumulation of either gains or losses in altitude, while selectively accounting for opposing changes in altitude, thereby giving a more meaningful indication of total altitude gain or loss. In other words, non-opposing altitude changes are accumulated in accordance with a selectively preset first accumulation threshold, while opposing altitude changes are used in accordance with a selectively preset second accumulation threshold to selectively offset, resume or restart accumulation of non-opposing altitude changes.

These and other objectives, features and advantages of the present invention will be understood upon consideration of the following detailed description of the invention and the accompanying drawings.

DETAILED DESCRIPTION OF THE INVENTION

Figure 1:
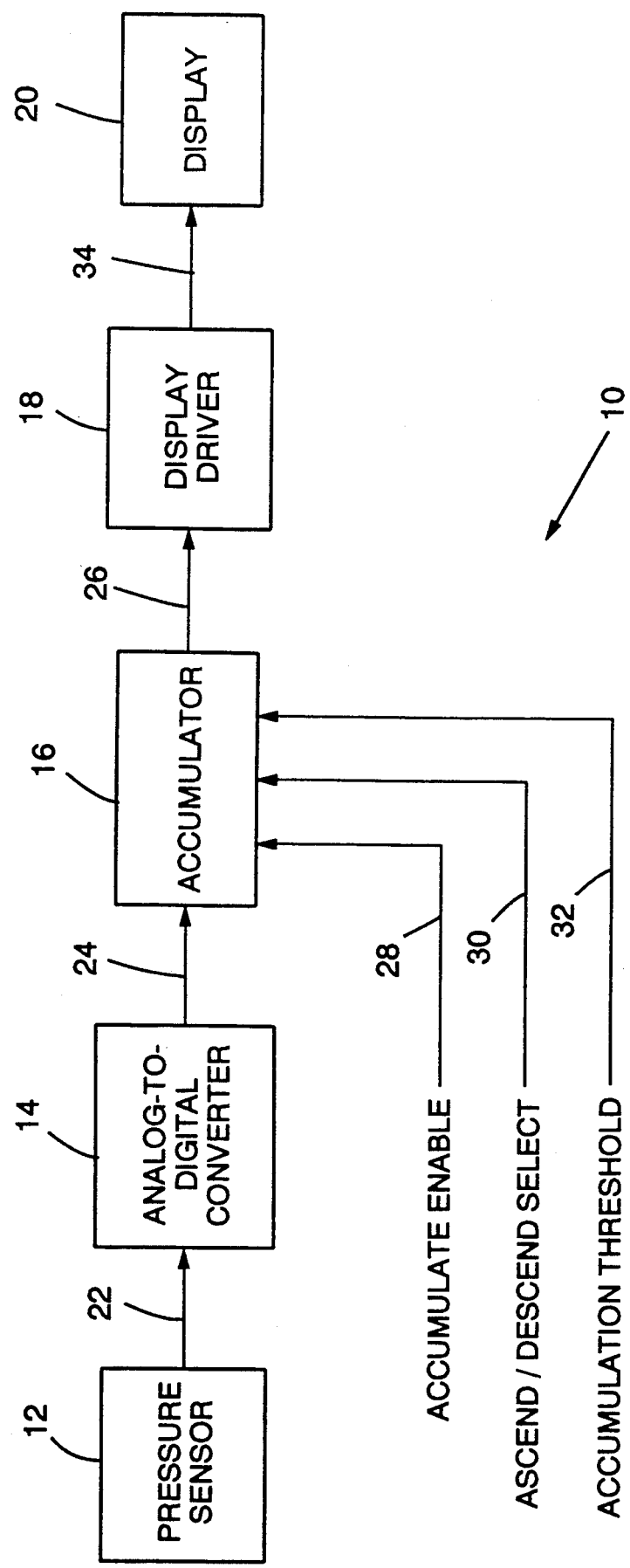
FIG. 1 is a functional block diagram of an accumulating altimeter in accordance with the present invention.

Referring to FIG. 1, an accumulating altimeter 10 in accordance with the present invention includes a pressure sensor 12, an analog-to-digital converter 14, an accumulator 16, a display driver 18 and a display 20. The pressure sensor 12 can be of any type commonly used for altimeters. Preferably, a solid state pressure sensor, or transducer, such as an integrated circuit having piezoresistors implanted within the semiconductor material, is used for greater sensitivity and reliability.

The pressure sensor 12 provides an analog signal 22 representing the present atmospheric pressure as measured by the pressure sensor 12. As is well known in the art, altitude is inversely proportional to atmospheric pressure. Therefore, the analog signal 22 provided by the pressure sensor represents the altitude of the pressure sensor 12 in accordance with the measured atmospheric pressure. This analog pressure signal 22 is received by the analog-to-digital converter 14 for conversion into an equivalent digital pressure signal 24 for use by the accumulator 16.

The accumulator 16 receives this digital pressure signal 24 and computes the altitude in accordance with well known mathematical formulas. The accumulator 16 then produces an accumulated altitude signal 26 for display, as discussed more fully below. The accumulator 16 also receives an accumulate enable signal 28 which selectively enables or disables the operation of the accumulator 16. For example, if the accumulating altimeter 10 were to be used on a bicycle (not shown), the accumulate enable signal 28 can originate from a speedometer (not shown), or from a sensor which senses rotation of one of the bicycle wheels (not shown), and be used to selectively enable the accumulator 16 only when the bicycle is in motion.

The accumulator 16 further receives an ascend/descend select signal 30 which tells the accumulator 16 whether to accumulate altitude gains or losses, as discussed more fully below. A related signal further received by the accumulator 16 is an accumulation threshold signal 32. This threshold signal 32, as discussed more fully below, tells the accumulator 16 when to begin accumulating altitude changes and when to establish reference altitudes.

The accumulated altitude signal 26 from the accumulator 16 is received by the display driver 18. A display signal 34 is then provided to a display 20, such as a liquid crystal display, for viewing by the user. For example, if used on a bicycle, the display 20 can be mounted upon the handlebars for easy viewing by the rider.

It will be recognized that various conventional pressure sensors, digital-to-analog converters, display drivers and displays exist and can be used in an altimeter 10 in accordance with the present invention. It will be further recognized that the accumulator 16 can consist of a number of conventional components. For example, the accumulator 16 can consist of a conventional microprocessor programmed to operate in accordance with the present invention. Alternatively, other conventional digital components, e.g. programmable logic arrays, can also be used.

Figure 2:
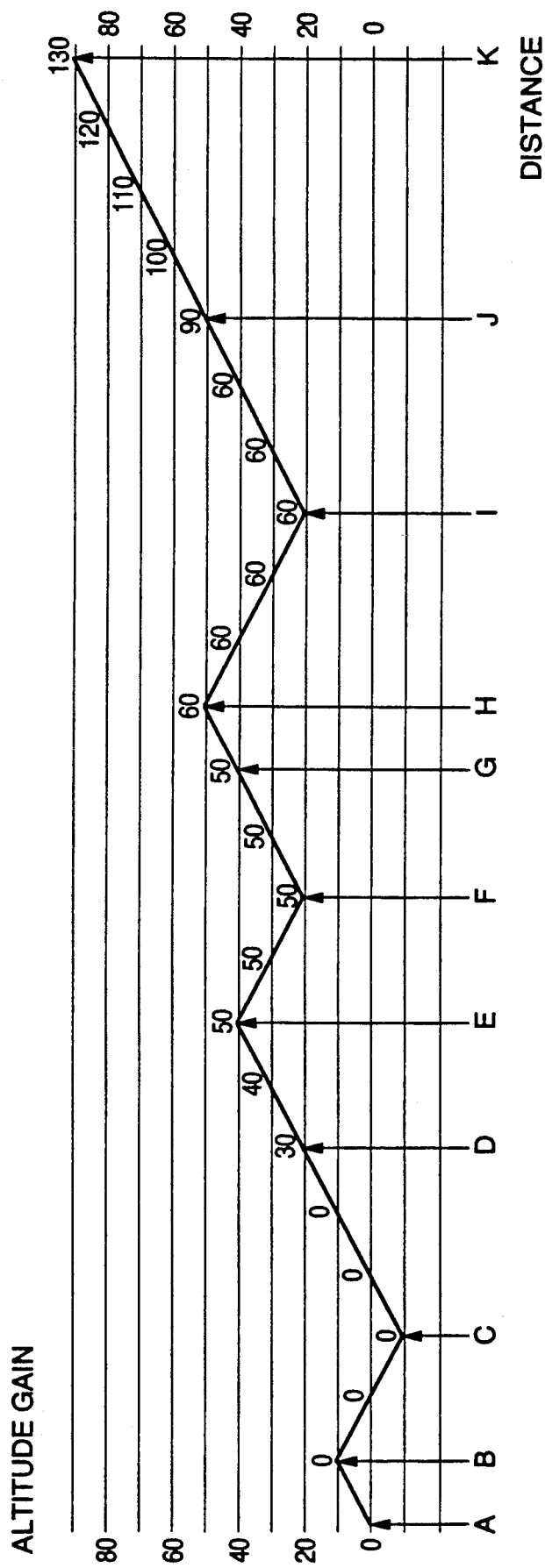
FIG. 2 is a graph illustrating exemplary altitude gains and losses over an arbitrary distance and the resulting accumulated altitude change with the present invention selectively set to accumulate altitude increases.

Referring to FIG. 2, the operation of and more meaningful altitude accumulation provided by the present invention can be understood. In the graph of FIG. 2, the abscissa represents distance and the ordinate represents altitude in increments of 10 feet. The numbers following along the graph represent the accumulated non-opposing altitude changes, i.e. gains.

For this example in FIG. 2, the accumulator 16 has been set to accumulate altitude gains, and both the non-opposing and opposing accumulation thresholds are set at 30 feet. The accumulation thresholds preferably have nonzero values representing altitude changes of at least 20 feet. This has the advantageous effect of allowing the altimeter 10 to initially mask, or filter, out signals representing false altitude changes caused by mechanical vibration or electrical noise within the altimeter 10. However, it should be understood that the accumulation thresholds need not necessarily be limited to such values and can have any desired values. Further, the non-opposing and opposing accumulation thresholds can be different or equal, as desired.

At the beginning of a trip, i.e. at point A, the accumulate enable signal 28 is activated. As the user travels up a 10 foot rise to the first peak at point B, the display still indicates zero accumulated altitude gain since the non-opposing accumulation threshold has not yet been exceeded. As the user descends 20 feet to point C, a new reference altitude is generated for the accumulator 16. In other words, whereas the original reference altitude was zero at point A, the reference altitude is now that of point C, i.e. $-10$ feet.

As the user ascends 30 feet to point D, the display 20 now indicates an accumulated altitude gain of 30 feet, since the altitude gain has now reached the non-opposing accumulation threshold of 30 feet, relative to the latest reference altitude of $-10$ feet at point C. As the user continues to travel up the rise another 20 feet to the next peak at point E, the altitude gained continues to be accumulated, resulting in an accumulated altitude gain of 50 feet.

As the user descends 20 feet to point F, the accumulated altitude does not change since no further altitude gains have yet been made. Furthermore, since the descent is only 20 feet, i.e. less than the opposing accumulation threshold of 30 feet, a new reference altitude is not established at point F. This descent of less than the opposing accumulation threshold will be used to offset subsequent non-opposing altitude changes, i.e. altitude gains.

As the rider ascends to point G, this 20 foot gain is offset, or cancelled out, by the preceding descent of 20 feet between points E and F. As the user ascends 10 feet further to point H, an additional 10 feet of altitude gain is accumulated, i.e. 60 feet of altitude gain have now been accumulated and can be displayed.

Descending 40 feet to point I, the user has now descended in altitude sufficiently to meet the opposing accumulation threshold of 30 feet. Therefore, a new reference altitude is once again established, this time at $+20$ feet at point I. Hence, just as in the beginning of the trip at point A, no further gains in altitude will be accumulated until the non-opposing accumulation threshold has been met.

As the user ascends 30 feet to point J, i.e. at $+50$ feet, the non-opposing accumulation threshold of 30 feet has again been met and is therefore added to the previous accumulated altitude gain of 60 feet, resulting in an accumulated altitude gain of 90 feet. As the user continues to ascend to point K, this further altitude gain of 40 feet is also accumulated, resulting in a total altitude gain accumulation of 130 feet.

Thus, as can be seen from the graph of FIG. 2, only altitude gains which follow those substantial enough to reach the non-opposing accumulation threshold are accumulated. Until the non-opposing accumulation threshold has been reached, minor descents and ascents, such as those occurring about the depressions at points C and F, are not accumulated and allowed to distort the altitude gain accumulation.

Figure 3A:
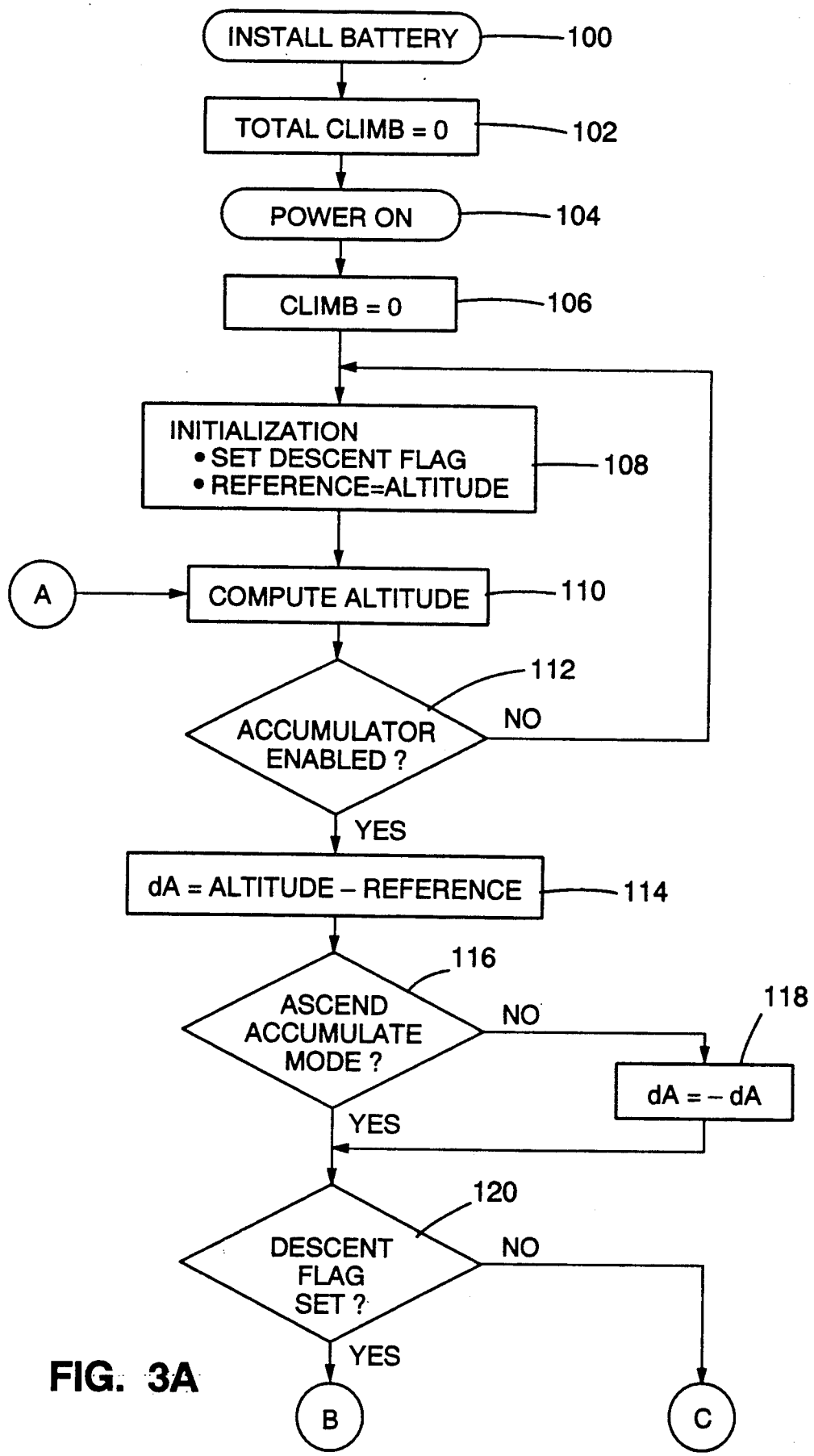
FIGS. 3A–3C are flow charts representing the operational steps of the present invention.
Figure 3B:
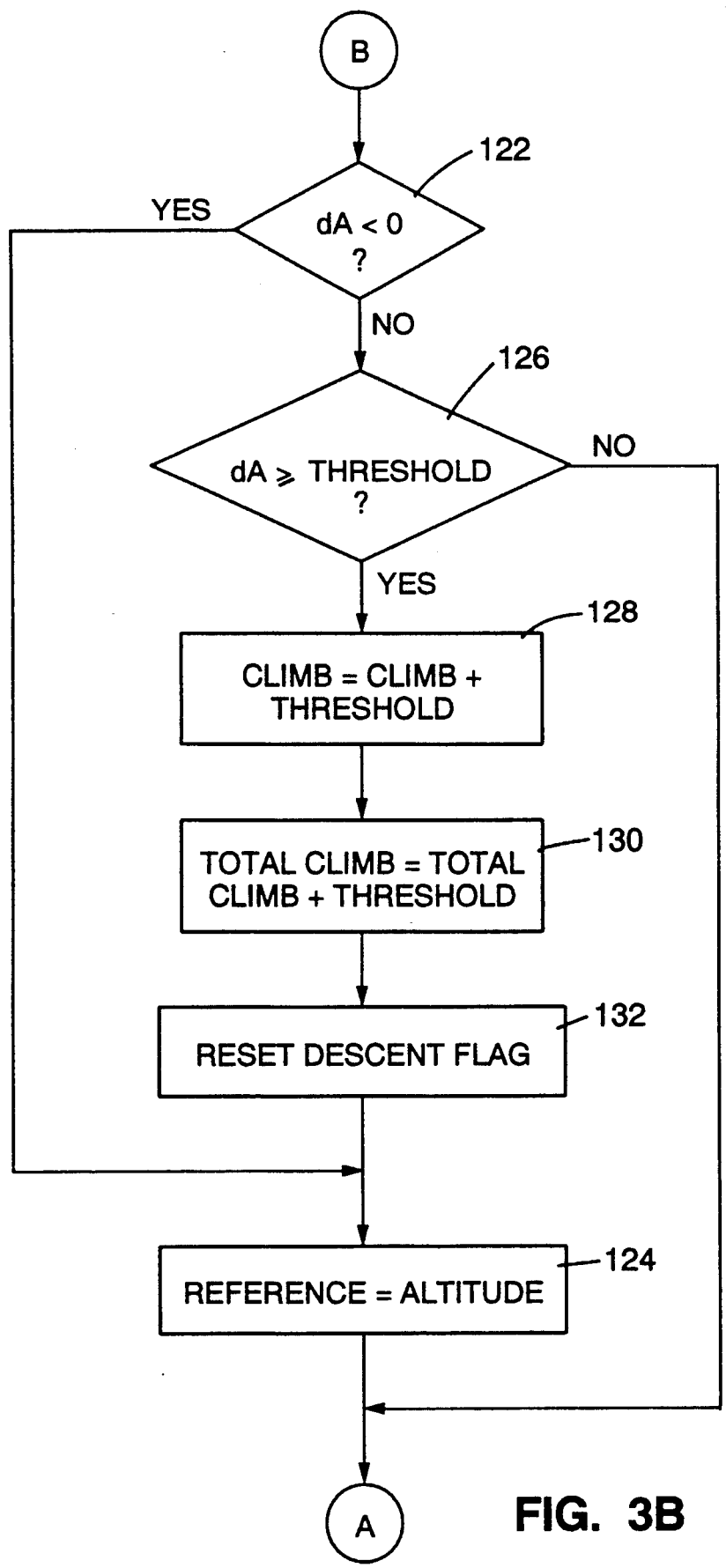
Figure 3C:
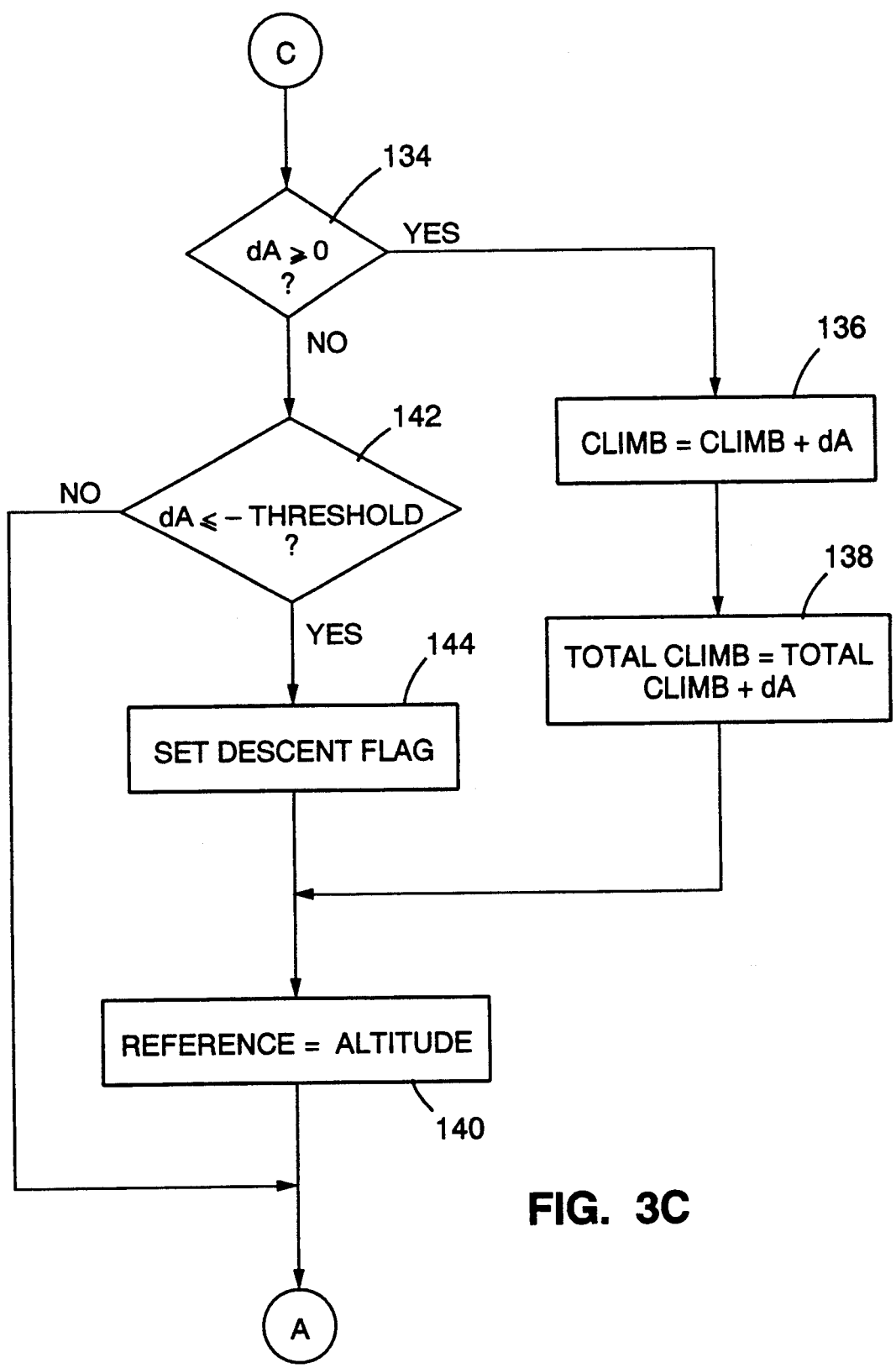

Referring to FIGS. 3A–3C, the operational steps performed by an accumulator 16 in accordance with the present invention can be understood. The first step 100 is to install the battery which powers the altimeter 10. Upon receipt of battery power, the first step 102 performed by the accumulator 16 is to set an internal variable "total climb" to zero. This variable will be used to represent all altitude changes accumulated by the altimeter 10.

The next step 104 is the turning on of the altimeter 10 by the user. The accumulator 16 then performs the step 106 of setting another internal variable "climb" to zero. This variable will be used to represent all altitude changes accumulated during a trip. It should be understood that use of the term "climb" is not to imply that only gains in altitude are to be accumulated. In other words, the "climb" or "total climb" accumulated selectively represents accumulated altitude changes, i.e. either gains or losses in altitude.

The next step 108 performed is initialization. A "descent flag" is set initially, as a default condition. A "reference" variable is initially set equal to the present altitude which is computed based upon the atmospheric pressure signal received from the pressure sensor 12 via the analog-to-digital converter 14, as discussed above. Following this, the steps 110, 112 of computing the present altitude and determining whether the accumulator 16 is enabled are performed. If the accumulator 16 is not enabled, an operational loop is entered and the preceding steps 108, 110, 112 are repeated until the accumulate enable signal 28 has been activated.

Once the accumulator 16 has been enabled, the next step 114 is to compute the change, if any, in altitude. The difference in altitude "dA" is computed by subtracting the reference altitude from the present measured altitude.

Following this, the next step 116 is to check whether ascents or descents are to be accumulated. If descents are to be accumulated, the next step 118 is to "invert," i.e. multiply by −1, the altitude change dA.

Following this "inversion" of the computed altitude change dA, or if operation is set in the ascend accumulate mode, the next step 120 is to check whether the descent flag has been set. Initially, as discussed above for the initialization step 108, the descent flag is set. In this case, and whenever the descent flag is set otherwise, the operation continues as discussed below for FIG. 3B. If the descent flag is not set, the operation continues as discussed below for FIG. 3C.

Referring to FIG. 3B, the first step 122 performed if the descent flag is set is to determine whether the altitude change is less than zero, i.e. negative. If the altitude change is negative, i.e. indicating a descent, the next step 124 is to set the reference altitude equal to the present altitude. Following that, operation resumes with the step 110 of recomputing the present altitude, as discussed above for FIG. 3A.

If the altitude change is not less than zero, the next step 126 is to determine whether the altitude change is greater than or equal to the non-opposing accumulation threshold. If it does not yet meet or exceed the non-opposing accumulation threshold, operation resumes with the step 110 of recomputing the present altitude, as discussed above for FIG. 3A.

If the altitude change does meet or exceed the non-opposing accumulation threshold, the next two steps 128, 130 update the climb and total climb variables by adding the value of the non-opposing accumulation threshold to each. Following that, the next steps 132, 124 are to reset the descent flag and set the reference altitude equal to the present altitude. Operation then resumes with the step 110 of recomputing the present altitude, as discussed above for FIG. 3A.

It should be understood that the steps 128, 130 of incrementing the climb and total climb variables by the value of the non-opposing accumulation threshold, along with the step 124 of resetting the reference altitude variable equal to the present altitude, represent merely one way of accumulating altitude changes in accordance with the present invention. In other words, this "ratcheting" of the reference altitude variable is simply one way to accumulate altitude changes. For example, the reference altitude variable can be set initially, and reset only after opposing altitude changes reaching the opposing accumulation threshold have been measured (per discussion above for FIG. 2), with non-opposing altitude changes accumulated as they are measured (similar to steps 136, 138 discussed below).

Referring to FIG. 3C, if the descent flag is set (discussed above for FIG. 3A), the next step 134 is to determine whether the altitude change is greater than or equal to zero, i.e. positive. If the altitude change is positive, thereby indicating an altitude gain, the next steps 136, 138 are to update the values of the climb and total climb variables by adding the amount of the altitude change to each. Following that, the next step 140 is to set the reference altitude equal to the present altitude, and then resume operation with the step 110 of recomputing the present altitude, as discussed above for FIG. 3A.

If the altitude change is not greater than or equal to zero, the next step 142 is to determine whether the altitude change is less than or equal to the "inverted" value of the opposing accumulation threshold, i.e. the opposing accumulation threshold value multiplied by −1. If it is not, operation resumes with the step 110 of recomputing the present altitude, as discussed above for FIG. 3A.

If the altitude change is less than or equal to the inverted value of the opposing accumulation threshold, the next step 144 is to set the descent flag once again, followed by the step 140 of setting the reference altitude equal to the present altitude. Following that, operation resumes with the step 110 of recomputing the present altitude, as discussed above for FIG. 3A.

As discussed above, the steps 136, 138 of incrementing the climb and total climb variables by the value of the altitude difference dA, along with the step 140 of resetting the reference altitude variable equal to the present altitude, represent merely one way of accumulating altitude changes in accordance with the present invention. This "ratcheting" of the reference altitude variable is simply one way to accumulate altitude changes. For example, the reference altitude variable can be set initially, and reset only after opposing altitude changes reaching the opposing accumulation threshold have been measured (per discussion above for FIG. 2), with non-opposing altitude changes accumulated as they are measured.

It should be understood that the altitude accumulation performed by the present invention is not limited to only altitude gains or only altitude losses. In other words, an altitude accumulator in accordance with the present invention can accumulate altitude changes in either direction. Furthermore, the present invention can be configured to accumulate altitude changes in both directions simultaneously and independently.

It should be further understood that the particular language used in the foregoing discussion and in the flow charts of FIGS. 3A–3C was selected as a matter of convenience for a preferred embodiment in which altitude gains are to be accumulated. However, altitude losses can be accumulated equally well, with the term "climb" representing altitude loss rather than gain, and the arbitrarily named "descent" flag corresponding to altitude gain rather than loss. Furthermore, the non-opposing and opposing accumulation thresholds can be independently selected for any desired altitude changes.

Various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. An altitude accumulator for selectively accumulating altitude changes, comprising:
   receiver means for receiving a pressure signal representing atmospheric pressure;
   computer means for computing altitude based upon said received pressure signal; and
   accumulator means for selectively accumulating and providing an accumulated altitude signal representing accumulated altitude changes which reach a first accumulation threshold in a first direction from a reference altitude, said altitude changes being based upon said computed altitude, wherein altitude changes in a second direction which do not reach a second accumulation threshold offset subsequent altitude changes in said first direction, and further wherein altitude changes in said second direction which do reach said second accumulation threshold cause said reference altitude to change in accordance therewith.

2. An altitude accumulator as recited in claim 1, wherein said first and second directions comprise altitude increases and decreases, respectively.

3. An altitude accumulator as recited in claim 1, wherein said first and second directions comprise altitude decreases and increases, respectively.

4. An altitude accumulator as recited in claim 1, wherein said first accumulation threshold is programmable.

5. An altitude accumulator as recited in claim 1, wherein said second accumulation threshold is programmable.

6. An altitude accumulator as recited in claim 1, wherein said first and second accumulation thresholds are equal.

7. An altitude accumulator as recited in claim 1, wherein said first accumulation threshold has a nonzero value.

8. An altitude accumulator as recited in claim 1, wherein said second accumulation threshold has a nonzero value.

9. An accumulating altimeter for selectively accumulating altitude changes, comprising:
   pressure sensor means for sensing atmospheric pressure and providing a pressure signal proportional thereto;
   computer means for receiving said pressure signal and computing altitude based thereon, and further for selectively accumulating and providing an accumulated altitude signal representing accumulated altitude changes which reach a first accumulation threshold in a first direction from a reference altitude, said altitude changes being based upon said computed altitude, wherein altitude changes in a second direction which do not reach a second accumulation threshold offset subsequent altitude changes in said first direction, and further wherein altitude changes in said second direction which do reach said second accumulation threshold cause said reference altitude to change in accordance therewith; and
   display means for receiving said accumulated altitude signal and for displaying said accumulated altitude changes.

10. An altitude accumulator as recited in claim 9, wherein said first and second directions comprise altitude increases and decreases, respectively.

11. An altitude accumulator as recited in claim 9, wherein said first and second directions comprise altitude decreases and increases, respectively.

12. An altitude accumulator as recited in claim 9, wherein said first accumulation threshold is programmable.

13. An altitude accumulator as recited in claim 9, wherein said second accumulation threshold is programmable.

14. An altitude accumulator as recited in claim 9, wherein said first and second accumulation thresholds are equal.

15. An altitude accumulator as recited in claim 9, wherein said first accumulation threshold has a nonzero value.

16. An altitude accumulator as recited in claim 9, wherein said second accumulation threshold has a nonzero value.

17. A method for selectively accumulating altitude changes, comprising the steps of:
   receiving a pressure signal which is proportional to atmospheric pressure;
   computing altitude based upon said received pressure signal;
   selectively accumulating altitude changes which reach a first accumulation threshold in a first direction from a reference altitude, wherein altitude changes in a second direction which do not reach a second accumulation threshold offset subsequent altitude changes in said first direction, and further wherein altitude changes in said second direction which do reach said second accumulation threshold cause said reference altitude to change in accordance therewith; and
   providing an accumulated altitude signal representing said accumulated altitude changes.

18. A method as recited in claim 17 further comprising the step of selecting said first and second accumulation thresholds.

19. A method for measuring and selectively accumulating altitude changes, comprising the steps of:
   measuring atmospheric pressure and providing a pressure signal proportional thereto;
   computing a reference altitude based upon said pressure signal;
   computing present altitude based upon said pressure signal;
   selectively accumulating altitude changes which reach a first accumulation threshold in a first direction from said reference altitude;
   offsetting subsequent altitude changes in said first direction with altitude changes in a second direction which do not reach a second accumulation threshold;
   changing said reference altitude in accordance with altitude changes in said second direction which do reach said second accumulation threshold; and
   providing an accumulated altitude signal representing said accumulated altitude changes.

20. A method as recited in claim 19 further comprising the step of selecting said first and second accumulation thresholds.

* * * * *